US012617455B2

(12) United States Patent
Hullihan et al.

(10) Patent No.: US 12,617,455 B2
(45) Date of Patent: May 5, 2026

(54) SYSTEMS AND METHODS FOR CONTROLLING VEHICLE TRAVEL

(71) Applicant: Honda Motor Co., Ltd., Tokyo (JP)

(72) Inventors: Michael P. Hullihan, Dublin, OH (US); Casey R. Burkhart, Marysville, OH (US); Matthew DJ Taylor, Westerville, OH (US); Joshua D. Pritchard, Worthington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 87 days.

(21) Appl. No.: 18/616,538

(22) Filed: Mar. 26, 2024

(65) Prior Publication Data

US 2025/0304156 A1     Oct. 2, 2025

(51) Int. Cl.
B62D 6/00          (2006.01)
B62D 15/02         (2006.01)

(52) U.S. Cl.
CPC ........... B62D 6/002 (2013.01); B62D 15/021 (2013.01)

(58) Field of Classification Search
CPC .............................. B62D 6/002; B62D 15/021
See application file for complete search history.

(56) References Cited

U.S. PATENT DOCUMENTS 10,661,827 B2    5/2020    Redeker et al.
11,608,108 B2    3/2023    Maruyama et al.

2005/0278077 A1 * 12/2005 Shin ........................ B62D 6/007
                                                               701/1
2013/0103263 A1 *  4/2013 Hsu ......................... B60T 8/1755
                                                               701/42
2021/0269087 A1 *  9/2021 Zhao ..................... B62D 5/0484

FOREIGN PATENT DOCUMENTS

| | | | |
|---|---|---|---|
| CN | 114104097 B | 6/2023 | |
| DE | 102010007615 A1 * | 9/2010 | ............. B62D 6/003 |
| DE | 102017223295 B4 | 3/2021 | |
| EP | 4087770 A1 | 11/2022 | |
| EP | 4201788 A1 | 6/2023 | |
| JP | 4123958 B2 | 7/2008 | |
| JP | 2010159002 A | 7/2010 | |
| KR | 20200047866 A * | 5/2020 | ............. B62D 7/159 |
| WO | WO-2014073079 A1 * | 5/2014 | ............. B60K 28/06 |
| WO | WO-2014091566 A1 * | 6/2014 | .......... B62D 15/025 |

(Continued)

*Primary Examiner* — Joseph J Dallo
(74) *Attorney, Agent, or Firm* — Armstrong Teasdale LLP

(57) ABSTRACT

A rear wheel steering system for a vehicle selectively controls a vehicle after front wheel steering is compromised. The rear wheel steering control system includes a rear wheel steering electronic control unit (ECU) and a stability control module. The rear wheel steering ECU electrically communicates with a front wheel steering ECU used to control the front wheel steering. The front wheel steering ECU is coupled to a front wheel steering angle sensor that detects a measured front wheel steering angle and transmits the measured front wheel steering angle to the rear wheel steering ECU. The stability control module is electrically coupled to the rear wheel steering ECU and receives the vehicle yaw data and vehicle speed data. The rear wheel steering ECU and/or stability control module estimates a front wheel steering angle for the vehicle for use in selectively steering the vehicle.

20 Claims, 4 Drawing Sheets

(56)             References Cited

FOREIGN PATENT DOCUMENTS

| WO | WO-2014178445 A1 * | 11/2014 | ............ | B60W 30/10 |
| WO | WO-2020095788 A1 * | 5/2020 | ............ | B62D 13/00 |
| WO | WO-2020250634 A1 * | 12/2020 | ............ | B62D 7/159 |
| WO | 2023025477 A1 | 3/2023 | | |
| WO | 2023054144 A1 | 4/2023 | | |

* cited by examiner

SYSTEMS AND METHODS FOR CONTROLLING VEHICLE TRAVEL

BACKGROUND

The field of the disclosure relates generally to steering control technologies used with vehicles and, more particularly to methods and systems for controlling vehicle travel when the front wheel steering of a vehicle is compromised.

At least some known vehicles are equipped with a front axle or wheel steering system and an automatic rear axle or wheel steering system. When such vehicles are traveling at lower speeds, when activated, the rear wheel steering system can enhance maneuverability and can enable tighter radius turns, and may assist in parallel parking, for example. However, when such vehicles are traveling at higher speeds, such as along an interstate, cornering radii are typically much larger and the rear wheel steering system may provide different assistance to the vehicle. For example, at higher traveling speeds, the rear wheel steering may provide automatic lateral steering control assist to facilitate lane centering, controlled lane changing, lane following, and/or collision avoidance purposes, for example.

Steering a vehicle is generally considered a critical function, so much so that at least some vehicles include rear wheel steering to assist in guiding, i.e., limping, a vehicle to the shoulder of a road if the front wheel steering system becomes compromised. In vehicles having front and rear wheel steering systems, rear wheel steering requires a front wheel steering angle signal to function. As such, at least some known vehicles include redundancy in the front and rear wheel steering systems. For example, in at least some vehicles a steer-by-wire system is used to control steering of the front wheels, and the rear wheel steering is controlled through a system of multiple steering actuators and/or multiple redundant sensors. However, the multiple redundant components increase the cost, weight, and complexity of the steering systems.

Accordingly, it is desirable to have systems and methods that facilitate controlling a vehicle with the use of rear wheel steering when the front wheel steering system is compromised, without requiring the use of redundant and complex steering components.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, these statements are to be read in this light, and not as admissions of prior art.

BRIEF DESCRIPTION

In one aspect, a rear wheel steering system for a vehicle having front wheel steering is provided. The rear wheel steering control system includes a rear wheel steering electronic control unit (ECU) and a stability control module. The rear wheel steering ECU is configured to selectively control the rear wheels of the vehicle. The rear wheel steering ECU is in electrical communication with a front wheel steering ECU used to control the front wheel steering of the vehicle. The front wheel steering ECU is coupled to a front wheel steering angle sensor configured to detect and transmit a front wheel steering angle of the vehicle front wheels to the rear wheel steering ECU. The stability control module is electrically coupled to the rear wheel steering ECU. The stability control module receives the vehicle yaw data and vehicle speed data. The stability control module and/or the rear wheel steering ECU is configured to estimate a front wheel steering angle for the vehicle, for use in selectively controlling steering of the vehicle rear wheels.

In another aspect a vehicle steering system is provided. The vehicle steering system includes a front wheel steering ECU, a rear wheel steering ECU, and a stability control module. The front wheel steering ECU is configured to selectively control front wheel steering of the vehicle. The front wheel steering ECU is coupled to a steering angle sensor that detects a front wheel steering angle for the vehicle. The rear wheel steering ECU is coupled to the front wheel ECU and receives the detected front wheel steering angle from the front wheel ECU to facilitate coordinated steering of the vehicle rear wheels with the vehicle front wheels. The stability control module is electrically coupled to the rear wheel steering ECU, and receives the vehicle yaw data and the vehicle speed data. The stability control module and/or the rear wheel steering ECU is configured to estimate a front wheel steering angle for the vehicle, for use in selectively controlling steering of the vehicle rear wheels when the front wheel steering has been compromised.

In a further aspect, a method of controlling movement of a vehicle after front wheel steering of the vehicle has been compromised is provided. The method includes generating an estimated front wheel steering angle after the front wheel steering has been compromised and transmitting the estimated front wheel steering angle to a rear wheel steering electronic control unit configured to selectively control the rear wheel steering. The method also includes selectively steering the rear wheels of the vehicle based on the estimated front wheel steering angle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

Figure 1:
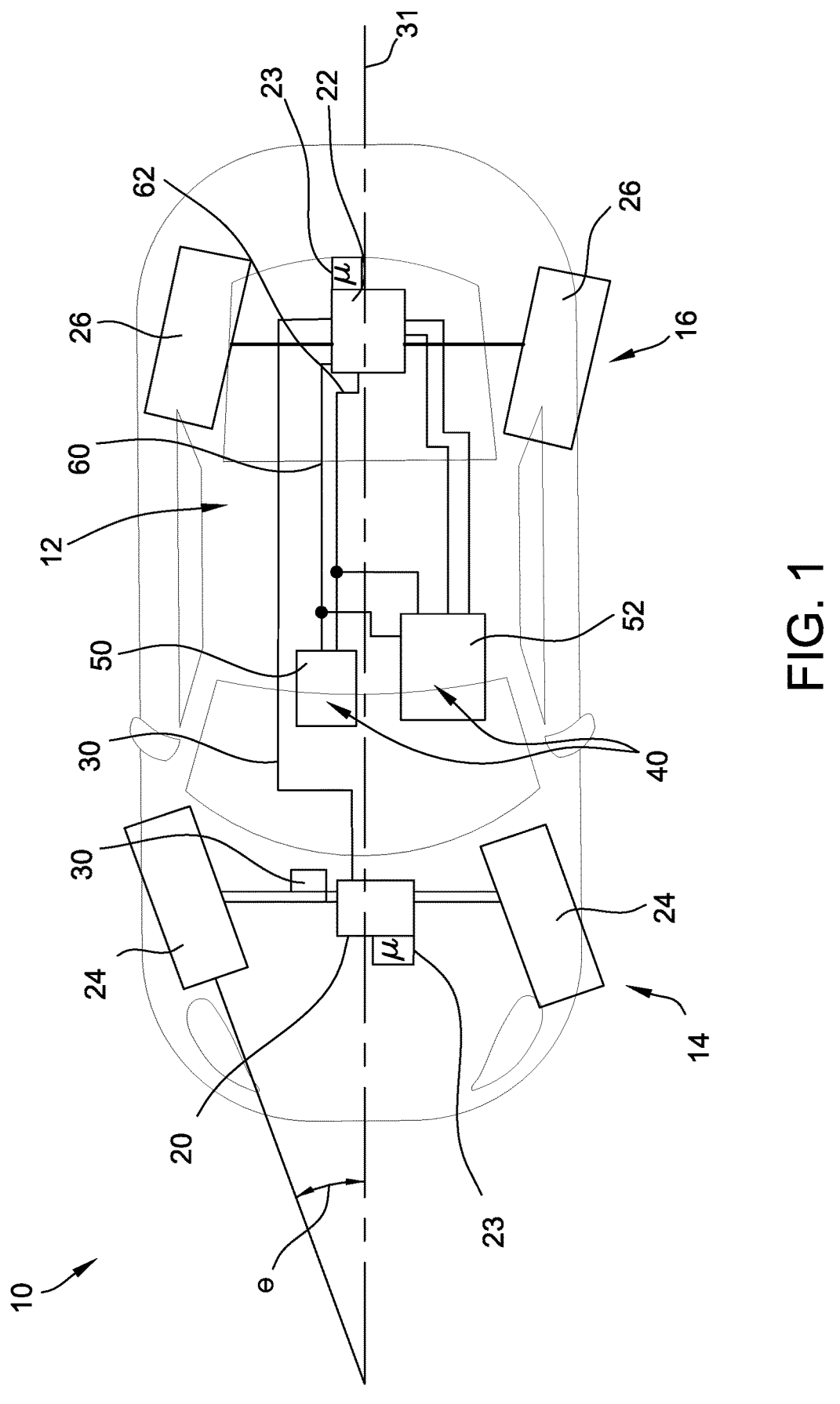
FIG. 1 is a schematic illustration of a vehicle including an exemplary rear axle or wheel steering assist system.

Like reference symbols in the various drawings are used to indicate like elements. The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object-oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

A computer program of one embodiment is embodied on a computer-readable medium. In an example, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in different environments without compromising any major functionality. In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments may relate to, inter alia, systems and methods for coordinating the travel of a vehicle using rear wheel steering, after front wheel steering has been compromised. More specifically the present embodiments, assist guiding a vehicle to the side or shoulder of a road, i.e., a maneuver known as limping, using rear wheel steering of the vehicle, when the front wheel steering of the vehicle has been compromised. Unlike known vehicle steering systems, the present steering system does not use any redundant components including additional actuators, sensors, or software features, for example, to enable the limping maneuver. More specifically, in the exemplary embodiment, the present rear wheel steering assist system does not require a front wheel steering angle signal to function, but rather, when the front wheel steering has been compromised, the present system uses data from existing sensors to estimate steering direction and steering angle, and based on those estimates, applies rear wheel steering as necessary to assist limping the vehicle to the side of the road.

Figure 2:
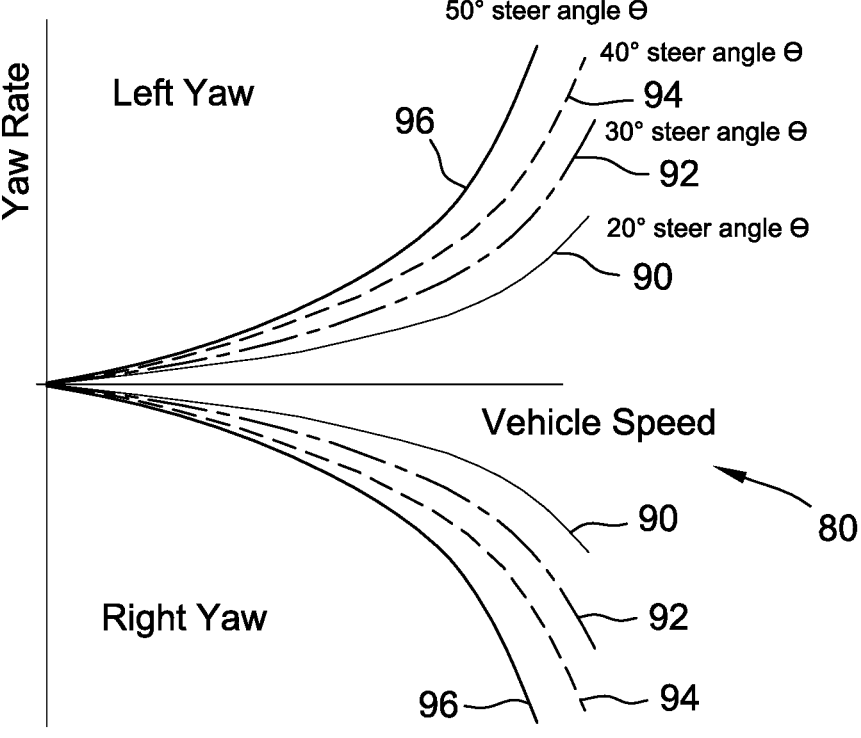
FIG. 2 is an exemplary graph illustrating a steering angle estimation that may be used with the rear axle steering assist system shown in FIG. 1.
Figure 3A:
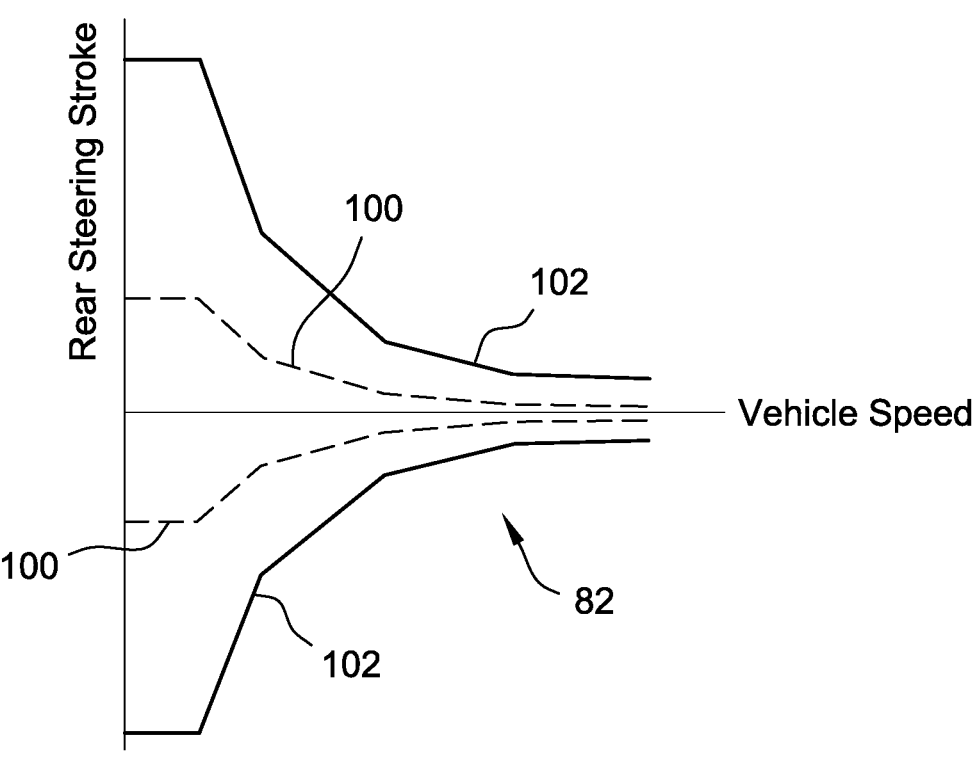
FIG. 3A is a graph illustrating an exemplary limited operating range of rear steering stroke.
Figure 3B:
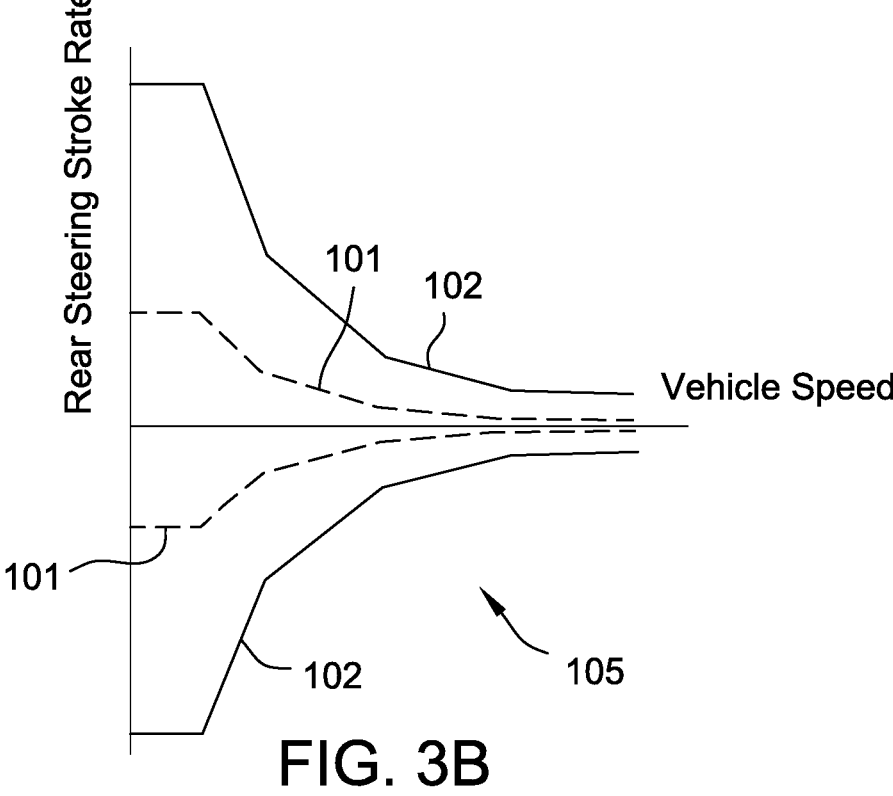
FIG. 3b is a graph illustrating an exemplary limited operating range of rear steering stroke rate.

FIG. 1 illustrates a schematic illustration of a vehicle 10 including an exemplary rear axle or wheel steering assist system 12, also known as a Limp Aside Rear wheel steering Assist (LARSA) system. FIG. 2 is an exemplary graph 80 illustrating a steering angle estimation that may be used with the rear axle steering assist system 12. FIG. 3A is an exemplary graph 82 illustrating an exemplary rear wheel steering stroke that may be used when the rear axle steering assist system 12 is assisting travel of the vehicle 10, and FIG. 3B is an exemplary graph 105 illustrating an exemplary limited range of rear steering stroke rate that may be used when the rear axle steering assist system 12 is assisting travel of the vehicle 10. In the exemplary embodiment, the vehicle 10 is equipped with front wheel or front axle steering 14 and rear wheel or rear axle steering 16. In the exemplary embodiment, vehicle steering is coordinated using a steer-by-wire system.

Accordingly, the vehicle 10 includes a front wheel steering electronic control unit (ECU) 20 and a rear wheel steering ECU 22 that each include a processor 23 that enables the vehicle front wheels 24 and/or the vehicle rear wheels 26 to selectively turn relative to a centerline 31 of the vehicle 10. A steering angle sensor 30 transmits a front wheel steering angle signal 32 to the front wheel steering ECU 20 that is indicative of a measured angular position θ of the vehicle front wheels 24 relative to the vehicle centerline 31. During normal vehicle operations, front wheel steering ECU 20 transmits the front wheel steering angle signal 32 to the rear wheel steering ECU 22 to enable coordinated steering of wheels 24 and 26.

In the exemplary embodiment, the vehicle 10 includes other control modules 40 that may influence operation of the vehicle 10. For example, in the exemplary embodiment, the vehicle 10 also includes a Supplemental Restraint System (SRS) module 50 and a Stability Control module 52. The SRS module 50 receives input from a plurality of sensors (not shown) coupled at various locations within the vehicle 10, such as, but not limited to, crush zone sensors that detect impact using deceleration and/or inertial changes, impact sensors positioned within pre-designed crush/crumple zones and that provide data to an airbag control unit (ACU), for example, and in-cabin sensors that generally provide passenger side inputs to the ACU to determine whether the airbags (not shown) should be deployed.

The additional sensors, other than sensor 30, may be coupled within different locations relative to vehicle 10 and such sensors may transmit data to the SRS module 50 and/or to the Stability Control module 52. For example, the vehicle 10 may include, but is not limited to only including electromechanical sensors and/or micro electro mechanical systems (MEMS) sensors. Generally, as is known, the electromechanical sensors may be inertia-based sensors that detect a sudden deceleration during impact, such as, but not limited to mass type sensors that include a sensing mass that is forced forward as a result of a change in the vehicle's motion, and/or roller-type sensors that a weight that alters tension on a biasing component as a result of change in the vehicle's motion. Also as is known, the MEMS sensors are small chips that contain integrated circuits and mechanical membranes that detect inertial change, such as accelerometers that measure vehicle change relative to an X-Y-Z reference axis, and/or gyroscopes that detect roll. Other known sensors that may be within the vehicle include, but are not limited to only including, satellite sensors, roll-over sensors, weight sensors, side-slip sensors, and/or seat belt sensors.

In the exemplary embodiment, at least one of the front wheel steering ECU 20, rear wheel steering ECU 22, SRS module 50, and/or Stability control module 22 includes a memory (not shown) that stores executable instructions. Stored in the memory are processor-executable instructions for receiving and processing input. The memory may include, but is not limited to only including, any computer-operated hardware suitable for storing and/or retrieving processor-executable instructions and/or data. The memory may include random access memory (RAM) such as dynamic RAM (DRAM) or static RAM (SRAM), read-only memory (ROM), erasable programmable read-only memory (EPROM), electrically erasable programmable read-only memory (EEPROM), and nonvolatile RAM (NVRAM). Further, the memory may include multiple storage units such as hard disks or solid-state disks in a redundant array of inexpensive disks (RAID) configuration. The memory may include a storage area network (SAN) and/or a network attached storage (NAS) system. In some embodiments, the memory includes memory that is integrated in a computing device. The memory may also include memory that is external to the computing device and may be accessed by a plurality of computing devices or ECUs. The above referenced memory types are exemplary only, and are thus not limiting as to the types of memory usable for storage of processor-executable instructions and/or data.

In the exemplary embodiment, during normal vehicle operations, using input received from a plurality of sensors, SRS module 50 determines a yaw of vehicle 10 and an amount of lateral g-forces the vehicle 10 is subjected to. During vehicle operations, SRS module 50 transmits a yaw signal 60 to the rear wheel steering ECU 22 and to the Stability Control module 52 indicative of an amount of yaw that the vehicle 10 is subjected to. Moreover, SRS module 50 also transmits a lateral g signal 62 to the rear wheel steering ECU 22 and to the Stability Control module 52 that is indicative of an amount of lateral g-forces that the vehicle is being subjected to during vehicle operations.

In addition to signals 60 and 62, in the exemplary embodiment, Stability Control module 52 receives inputs from a plurality of other sensors. Such data may be the same data received by front wheel steering ECU 20 and/or SRS module 50, or may be any other data that is independent of data transmitted to ECU 20 and/or module 50. Moreover, Stability Control module 52 may receive any other data relating to vehicle 10 that enables module 52 to function as described herein. For example, Stability Control module 52 may receive data from any sensor that can detect the vehicle's speed, an amount of yaw the vehicle 10 is experiencing, and/or an amount of acceleration/deceleration that the vehicle 10 is experiencing.

Vehicle 10 includes a sensor or any other known detection device (not shown) that detects a failure of the front wheel steering 14. When a failure of the front wheel steering 14 occurs, front wheel steering ECU 20 may no longer be able to transmit the front wheel steering angle signal 32 to the rear wheel steering ECU 22. As such, during such a failure, the rear wheel steering ECU 22 no longer receives the measured angular position θ of the vehicle front wheels 24 and normal, coordinated steering between the front and rear wheels 24 and 26, respectively, as controlled by the rear wheel steering ECU 22, ceases. Moreover, in such a failure, generally the sensors used to detect the speed of the vehicle 10 and the yaw of the vehicle 10 remain functional, and data from such sensors continues to be transmitted to Stability Control module 52 and/or to SRS module 50.

During a failure of the front wheel steering 14, a warning indicator (not shown) will typically illuminate and/or sound to alert a driver of the vehicle 10 of the failure of the front wheel steering 14. When such a failure occurs, a driver will want to, and should guide the vehicle 10 towards a shoulder or a side of the road (not shown in FIG. 1, 2, or 3). However, because of at least the combination of the lack of front wheel power steering assist and the weight of the vehicle, the steering effort required by a driver to guide the vehicle 10 to the side of the road may be significant and steering may be difficult. The LARSA system 12 described herein can reduce the cornering load induced to the vehicle front wheels 24 and can facilitate significantly reducing the steering effort necessary to guide the vehicle 10 to the side of the road, thus increasing the safety of such a maneuver for the driver of the vehicle 10.

Graph 80 illustrates a steering angle estimation for the vehicle front wheels 24, generated by Stability Control module 52 and transmitted for use by the rear axle steering assist system 12. More specifically, graph 80 correlates exemplary steering angles 90, 92, 94, and 96 against measured left and right yaw rates of the vehicle 10 and the speed of the vehicle 10. In the exemplary embodiment, either the Stability Control module 52 and/or the rear wheel steering ECU 22 uses a known integrated bicycle model to determine an estimated vehicle steering angle θ of the vehicle front wheels 24, i.e., estimates the front wheel steering position, using a correlation of vehicle yaw data received and vehicle speed data received.

Graph 82 illustrates an exemplary typical rear wheel steering operation range 102 and an exemplary limited rear wheel steering operation range 100. Graph 105 illustrates an exemplary limited rear wheel steering stroke rate range 101. In the exemplary embodiment, a typical rear wheel steering operation range 102 and limited rear wheel steering operation range 100 are applied to rear wheel steering operation by at least one of rear wheel steering ECU 22 (shown in FIG. 1) and/or stability control module 52 (shown in FIG. 1). Graph 82 illustrates that both the typical rear wheel steering operation range 102 and the limited rear wheel steering operation range 100 are dependent on vehicle speed. Graph 105 illustrates that the limited rear wheel steering stroke rate is also dependent on vehicle speed. Vehicle speed increases from left to right on Graph 82 and on Graph 105 (i.e., low speed on left side of Graphs 82 and 105, higher speed on right side of Graphs 82 and 105). Therefore, Graph 82 illustrates that for both the typical rear wheel steering operation range 102 and the limited rear wheel steering operation range 100, at low speeds a larger rear wheel steering stroke is allowed, and as the vehicle speed increases, the amount of steering stroke allowed is reduced. Furthermore, Graph 82 illustrates that, at any given vehicle speed, the rear wheel steering stroke 101 allowed when the limited rear wheel steering operation range 100 is applied, is lower than the rear wheel steering stroke 101 allowed when the typical rear wheel steering operation range 102 is applied. In the exemplary embodiment, the limited rear wheel steering operation range 100 is applied, following a failure of the front wheel steering 14 (i.e., when the rear wheel steering ECU 22 is controlling rear wheel steering based on the estimated front wheel steering angle, rather than based on the measured front wheel steering angle).

More specifically, graph 82 enables a limp aside operating limit to be applied as a function of a rear wheel steering stroke 100 (i.e., generally a time response for the LARSA system 12 to actively turn the vehicle rear wheels) and vehicle speed. A similar operating limit may be applied to a rear wheel steering stroke rate 101. Because the LARSA system 12 has a lower accuracy using an estimated front wheel steering angle and has an inherent delay, relative to receiving data in real time from a true steering angle sensor, the LARSA system 12 is programmed to operate within the narrower or limited operation range 100 than the typical operating range 102 available to the rear wheel steering module 22 when the front wheel steering 14 is operating normally. The narrower operation range 100 limits the rear wheel steering stroke 100 and/or the rear wheel steering stroke rate 101 significantly as compared to the normal operating range 102.

The operation range of the LARSA system 12 can be implemented using computer programming or engineering techniques including computer software, firmware, hardware, or any combination or subset thereof. As such, changes or updates to the LARSA system 12, because of future developments, for example, may be easily performed without requiring the removal of components. In one embodiment, the limited operation range of the LARSA system 12 is applied or programmed within rear wheel steering ECU 22. In another embodiment, the limited operation range of the LARSA system 12 is programmed or applied within Stability Control module 52.

Figures 4A, 4B:
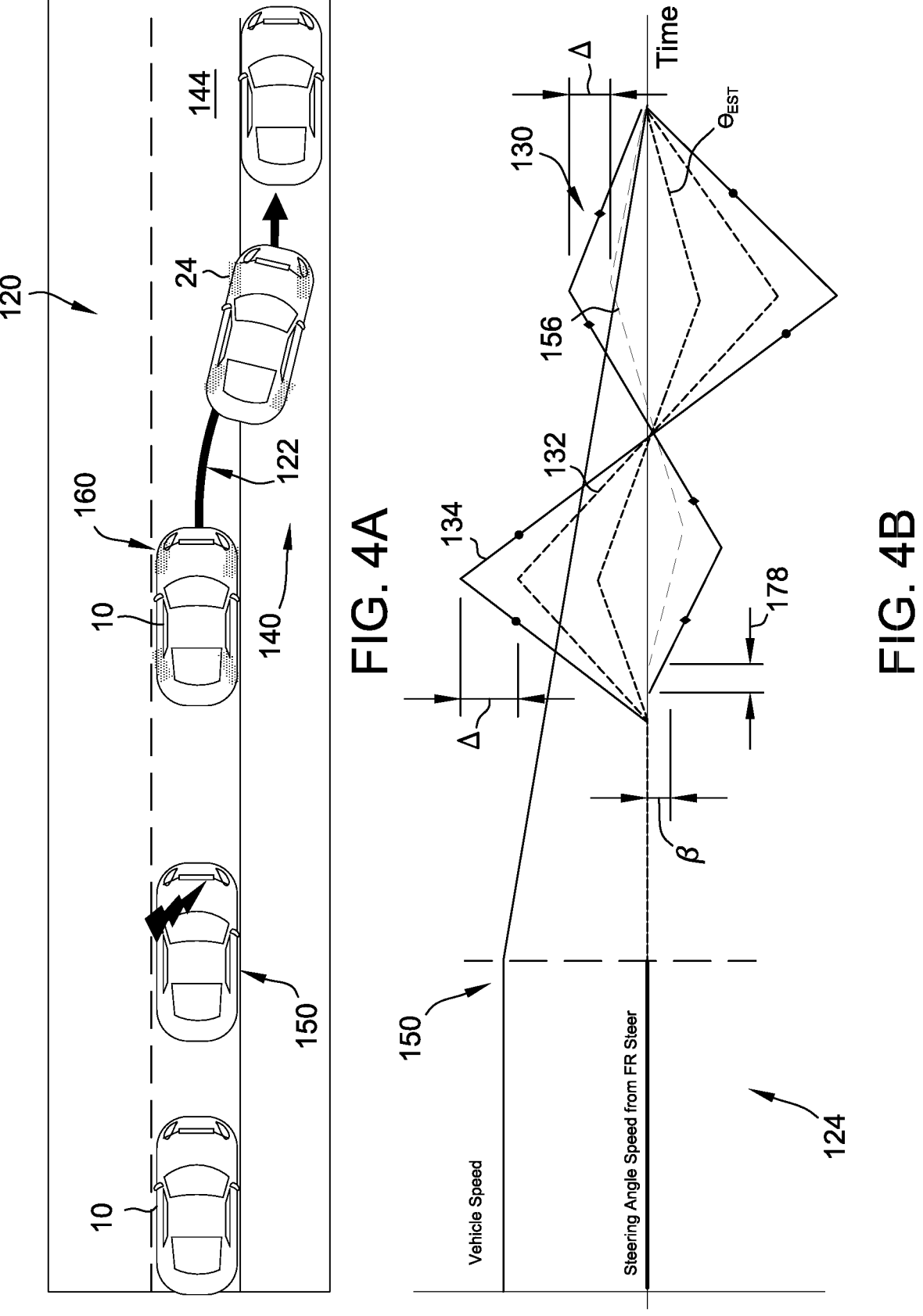
FIG. 4A is a block diagram of an exemplary vehicle path that may occur using the rear axle steering assist system shown in FIG. 1 following a compromise of the front axle steering system.
FIG. 4B is an exemplary graph illustrating the steering effort that may be required for the vehicle to travel along the path illustrated in FIG. 4A.

FIG. 4A is a schematic diagram 120 of an exemplary vehicle path 122 that may occur when a vehicle 10 has a front wheel steering failure and is using the rear axle steering assist system 12 (shown in FIG. 1). FIG. 4B is an exemplary graph 124 comparing exemplary steering efforts 130 that may occur as the vehicle 10 travels along path 122, following a front wheel steering compromise, and with 132 and without 134 the use of the LARSA system 12 described herein. More specifically, in FIG. 4B, the exemplary steering efforts 130 correlate the vehicle speed versus time as the vehicle 10 is guided towards the side 140 of a road 144. Moreover, FIG. 4B also includes exemplary plots of the driver steering angle 150 of the front wheels 24 of the vehicle 10, a yaw rate 142 of the vehicle 10, and an amount of steering input 156 of the LARSA system 12 as it operates within its limited operating range 100 (shown in FIG. 3).

Aa seen in FIGS. 4A and 4B, a speed of the vehicle 10 decreases after the vehicle front wheel steering 14 is compromised at point 150. At this travel point 150, transmission of the vehicle steering angle θ of the vehicle front wheels 24 to the rear wheel steering ECU 22 stops, and the driver of the vehicle 10 is alerted of the front wheel steering failure. Moreover, and as described above, Stability Control module 52 transmits an estimated steering angle $θ_{est}$ of the vehicle front wheels 24 to the rear wheel steering ECU 22. Alternatively, the rear steering ECU 22 estimates the steering angle $θ_{est}$ of the vehicle front wheels 24.

At travel point 160, the driver of the vehicle 10 will begin to guide the vehicle 10 towards the side 140 of the road 142. Because the front wheel steering has failed, at least the combination of the lack of front wheel power steering assist and the weight of the vehicle 10, may require the driver to exert an additional steering effort to turn the front wheels to a suitable steering angle 150 to guide the vehicle 10 to the side of the road 144. Without the use of LARSA system 12, the steering effort 134 required by the driver may be significant as the speed of the vehicle 10 is decreasing. However, as shown in FIG. 4B, with the use of the LARSA system 12, the steering effort 132 required by the driver is significantly less than the corresponding effort of a driver within a vehicle 10 without LARSA system 12. For example, see the decreased effort required A in FIG. 4B.

Notably, as described herein, and as shown in FIG. 4B, the LARSA 12 assists in steering the rear wheels 26 only after the driver has begun guiding the vehicle 10 towards the side 140 of the road 144. More specifically, the LARSA system 12 is programmed to not actively assist in the limping process, until a pre-defined threshold change β in vehicle yaw rate 184, following a front wheel steering failure, is either detected or is transmitted to the rear wheel steering ECU 22. As a result, a time delay 178 is created between the driver starting to guide the vehicle 10 towards the roadside 140 and the LARSA system 12 actively assisting in the limping process.

In the exemplary embodiment, the LARSA system 12 facilitates reducing the redundancy requirements associated with known steer-by-wire (StBW) applications. More specifically, known vehicle StBW applications use significant redundancies including additional steering angle sensors, actuators, wheel controllers, motors, ECUs, and/or sensors. Such redundancies increase at least the cost, weight, and complexity of the vehicle. The LARSA system 12 described herein enables the front wheel steering angle and direction to be estimated using control modules and sensor data that is already included for use with the front wheel steering ECU and as such, redundant equipment such as a redundant steering angle sensor, is not required.

As disclosed above, there is a need for systems and methods that enable the safe coordinated steering of the rear wheels of a vehicle, following a front wheel steering failure. The systems and methods described herein address by at least one of: (i) improving the limp aside rear wheel steering assist in the event of a front wheel steering failure; (ii) reducing the cost, complexity, and weight of the vehicle as compared to known vehicles that include rear wheel steering; (iii) reducing the likelihood of component failure by reducing the number of redundancies and the complexity associated with those redundancies; (iv) improving the safety to the driver of such a vehicle by limiting the operation range of the LARSA system following a front wheel driving failure; and/or (v) enabling the operating limitations of the LARSA system to be easily and efficiently updated and changed without requiring a time-consuming process.

The computer-implemented methods and systems discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

Exemplary embodiments of systems and methods for reliably controlling the rear wheel steering of a vehicle following a front wheel steering failure are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computer devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose various implementations, including the best mode, and also to enable any person skilled in the art to practice the various implementations, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A rear wheel steering system for a vehicle having front wheel steering, said rear wheel steering system comprising:
   a rear wheel steering electronic control unit (ECU) configured to selectively control the rear wheels of the vehicle, said rear wheel steering ECU in electrical communication with a front wheel steering ECU used to control the front wheel steering of the vehicle, the front wheel steering ECU is communicatively coupled to a front wheel steering angle sensor configured to detect a measured front wheel steering angle of the vehicle front wheels that is transmitted to said rear wheel steering ECU; and
   a stability control module electrically coupled to said rear wheel steering ECU, said stability control module receives vehicle yaw data and vehicle speed data, at least one of said stability control module and said rear wheel steering ECU configured to estimate a front wheel steering angle for the vehicle, said rear wheel steering ECU selectively controls steering of the vehicle rear wheels based at least on the estimated front wheel steering angle for the vehicle, and said rear wheel steering ECU limits at least one of a rear steering stroke and a rear steering stroke speed when controlling the rear wheel steering angle based on the estimated front wheel steering angle.

2. The system of claim 1, wherein, when the measured front steering angle is received at said rear wheel steering ECU, said rear wheel steering ECU selectively controls the rear wheel steering angle based on the measured front steering angle, and wherein, when the measured front steering angle is not received at the rear wheel steering ECU, said rear wheel steering ECU selectively controls the rear wheel steering angle based on the estimated steering angle.

3. The system of claim 1 wherein at least one of said rear wheel steering ECU and said stability control module uses a bicycle model in conjunction with data received from at least one sensor to estimate the front wheel steering angle for the vehicle.

4. The system of claim 1 wherein at least one of said rear wheel steering ECU and said stability control module is further configured to limit at least one of the rear steering stroke and the rear steering stroke speed based upon the vehicle speed data.

5. The system of claim 4 wherein at least one of said rear wheel steering ECU and said stability control module is further configured to control movement of the vehicle rear wheels only after a pre-defined yaw threshold for the vehicle has been exceeded.

6. The system of claim 1 wherein the rear wheel steering ECU facilitates reducing the steering effort of a driver of the vehicle when the vehicle front wheel steering has been compromised and the vehicle is being guided to a side of the road.

7. The system of claim 1 further comprising a supplemental restraint system (SRS) module electrically coupled to at least one of the stability control module and the rear wheel steering ECU, said SRS module configured to generate the vehicle yaw data and the vehicle speed data.

8. A vehicle steering system comprising:
   a front wheel steering electronic control unit (ECU) configured to selectively control front wheel steering of the vehicle, said front wheel steering ECU coupled to a steering angle sensor that detects a measured front wheel steering angle for the vehicle;
   a rear wheel steering ECU communicatively coupled to said front wheel ECU and configured to receive the front wheel steering angle from the front wheel ECU to facilitate coordinated steering of the vehicle rear wheels with the vehicle front wheels; and
   a stability control module electrically coupled to said rear wheel steering ECU, said stability control module receives vehicle yaw data and vehicle speed data, at least one of said rear wheel steering ECU and said stability control module configured to estimate a front wheel steering angle for the vehicle, said rear wheel steering ECU selectively controls steering of the vehicle rear wheels based at least on the estimated front wheel steering angle, and said rear wheel steering ECU limits at least one of a rear steering stroke and a rear steering stroke speed when controlling the rear wheel steering angle based on the estimated front wheel steering angle, when the front wheel steering has been compromised.

9. The vehicle steering system of claim 8, wherein the measured front steering angle is received at said rear wheel steering ECU, said rear wheel steering ECU selectively controls the rear wheel steering angle based on the measured front steering angle, and wherein, when the measured front steering angle is not received at the rear wheel steering ECU, said rear wheel steering ECU selectively controls the rear wheel steering angle based on the estimated front wheel steering angle.

10. The vehicle steering system of claim 8 wherein at least one of said rear wheel steering ECU and said stability control module uses detected yaw data for the vehicle and detected speed data for the vehicle in combination with a bicycle model to estimate the front wheel steering angle for the vehicle.

11. The vehicle steering system of claim 9 further comprising a supplemental restraint system (SRS) module, and at least one of a vehicle yaw sensor and a vehicle speed detector, said SRS module electrically coupled to at least one of the stability control module and the rear wheel steering ECU, said SRS module configured to generate the vehicle yaw and the vehicle speed data.

12. The vehicle steering system of claim 8 wherein at least one of said rear wheel steering ECU and said stability control module is further configured to limit at least one of the rear steering stroke and the rear steering stroke speed based upon the vehicle speed data.

13. The vehicle steering system of claim 12 wherein said rear wheel steering ECU facilitates reducing steering effort to a driver of the vehicle after the front wheel steering has been compromised.

14. The vehicle steering system of claim 13 wherein said rear wheel steering ECU is only operable when the front wheel steering has been compromised after a pre-defined yaw threshold for the vehicle has been exceeded.

15. The vehicle steering system of claim 9 wherein said rear wheel steering ECU facilitates reducing an overall weight of the vehicle.

16. The vehicle steering system of claim 9 wherein said front wheel steering ECU is facilitates controlling front wheel steering through a steer-by-wire application, said rear wheel steering ECU facilitates reducing a wiring complexity of the vehicle.

17. A method of controlling movement of a vehicle after front wheel steering of the vehicle has been compromised, said method comprising:
   generating an estimated front wheel steering angle after the front wheel steering has been compromised;
   transmitting the estimated front wheel steering angle to a rear wheel steering electronic control unit configured to selectively control the rear wheel steering; and
   selectively steering the rear wheels of the vehicle based on the estimated front wheel steering angle; and
   limiting at least one of a rear steering stroke and a rear steering stroke speed when controlling the rear wheel steering angle based on the estimated front wheel steering angle.

18. A method in accordance with claim 17 wherein generating an estimated front wheel steering angle after the front wheel steering has been compromised further comprises:
   detecting a yaw of the vehicle and a speed of the vehicle; and
   using a bicycle model to correlate the vehicle yaw and the vehicle speed to generate the estimated front wheel steering wheel angle.

19. A method in accordance with claim 18 wherein selectively steering the rear wheels of the vehicle further comprises selectively steering the rear wheels of the vehicle only after a pre-defined yaw threshold for the vehicle has been exceeded.

20. A method in accordance with claim 18 wherein selectively steering the rear wheels of the vehicle further comprises selectively steering the rear wheels of the vehicle without receiving a detected front wheel steering angle.

* * * * *